United States Patent [19]

Guls

[11] 4,315,992
[45] Feb. 16, 1982

[54] CARBON-CONTAINING AND UNCARBONIZED SINTER MAGNESIA REFRACTORIES

[75] Inventor: Hans-Jürgen Guls, Leoben, Austria

[73] Assignee: Veitscher Magnesitwerke-Actien-Gesellschaft, Vienna, Austria

[21] Appl. No.: 175,962

[22] Filed: Aug. 7, 1980

[30] Foreign Application Priority Data

Aug. 10, 1979 [AT] Austria ............................ 5453/79

[51] Int. Cl.³ .......................................... C04B 35/04
[52] U.S. Cl. ..................................... 501/101; 501/114
[58] Field of Search ................................ 106/56, 59

[56] References Cited

U.S. PATENT DOCUMENTS

| | | | |
|---|---|---|---|
| 2,753,612 | 7/1956 | Kramer | 106/59 |
| 3,036,925 | 5/1962 | Heuer | 106/59 |
| 3,258,353 | 6/1966 | Heuer | 106/59 |
| 3,288,616 | 11/1966 | Bowman | 106/59 |
| 3,340,075 | 9/1967 | Stoddard et al. | 106/59 |
| 3,351,476 | 11/1967 | Weaver et al. | 106/59 |
| 3,370,968 | 2/1968 | Weaver | 106/59 |
| 3,775,140 | 11/1973 | Visser et al. | 106/59 |

FOREIGN PATENT DOCUMENTS 1153153 5/1969 United Kingdom .

*Primary Examiner*—O. R. Vertiz
*Assistant Examiner*—Mark Bell
*Attorney, Agent, or Firm*—Kurt Kelman

[57] ABSTRACT

A refractory brick or mass is comprised of 60 to 97% of sinter magnesia, an amount of a carbon-containing substance producing a residual content of 2 to 30% of carbon in an end product after carbonization, as determined by ASTM norm C 831-76, and 1 to 20%, calculated as chromium metal, of metallic chromium or a metallic chromium compound, which is primarily fine-grained and at least 80% thereof, based on the chromium metal content, has a grain size of less than 1 mm, all percentages being by weight.

5 Claims, No Drawings

CARBON-CONTAINING AND UNCARBONIZED SINTER MAGNESIA REFRACTORIES

The present invention relates to a refractory, carbon-containing and uncarbonized brick or mass based on sinter magnesia and containing an amount of a liquid or solid carbon-containing substance producing a residual content of 2 to 30%, by weight, of carbon in an end product after burning or carbonization, as determined by ASTM norm C 831-76.

Calcium ferrite slags, i.e. slags with a $CaO/SiO_2$ weight ratio above 1.87 and containing FeO which combines with the CaO into a dicalcium ferrite phase, are found in many metallurgical ovens and vessels, such as oxygen converters, electric arc furnaces, pig iron mixers, ladles and the like. Linings of refractory bricks or masses of the above type have been found useful in such ovens or vessels to resist these slags. Useful binders for such sinter magnesia bricks or masses include salt solutions, such as sulfates and phosphates, and organic substances, such as tar, pitch, resin or oil. The carbon may be added in solid form, for example as graphite, coke or carbon black. If the liquid binder, such as pitch, contains a sufficiently large amount of carbonizable carbon, no solid carbon need be added.

Carbon-containing and uncarbonized bricks and masses used as furnace or vessel linings do not wear by peeling off discontinuously but wear primarily in a continuous fashion because, compared to the ceramically bound (calcined) bricks, they are less rigid and the carbon has an infiltration-inhibiting effect which reduces the compaction of the lining by penetrating slag components. This results in an essentially slower wear of the lining.

However, during the metallurgical process, slags may occur at times and places, whose weight ratio of $CaO/SiO_2$ is far below 1.87, for example at the beginning of the charge when the added CaO is not yet dissolved or in the range of dissolving pieces of FeSi which are added as slag formers. These occasional or spatially limited acidic slags react with the periclase to corrode the magnesia grains strongly and wear them rapidly by forming magnesium-containing calcium silicates which melt at low temperatures. Although these acidic slags occur only for short periods of time during the metallurgical process, they may greatly accelerate the wear of linings of carbon-containing and uncarbonized linings.

Dolomite or magnesia-chromium materials would be chemically resistant to such $SiO_2$-rich slags. Dolomite, however, has the disadvantage of being less resistant to FeO-rich slags while magnesia-chromium materials is partially reduced to metallic iron and chromium in the presence of carbon in the lining, which leads to a decomposition of the binder phase and, therefore, strongly reduces the operating life of the lining.

It is the primary object of this invention to provide a lining material for metallurgical furnaces and vessels, which is resistant to calcium ferrite slags as well as to acidic slags, i.e. slags whose weight ratio of $CaO/SiO_2$ is far below 1.87.

The above and other objects are accomplished according to the invention with a brick or mass of the first indicated type and which is further comprised of 1 to 20%, calculated as chromium metal, of metallic chromium or a chromium compound, the metallic chromium or metallic chromium compound being primarily fine-grained and at least 80% thereof, based on the chromium metal content, having a grain size of less than 1 mm, and 60 to 97% of sinter magnesia, all percentages being by weight.

When slag contacts a refractory lining of such bricks or masses, it reacts with the components of the lining in a thin surface layer in the following manner:

First, the carbon in the lining layer operates as a reducing agent and reduces the FeO component of the slag to metallic iron which mixes with the metal bath in the furnace or vessel. In this reduction reaction, the CaO remains in the slag as a phase melting at a high temperature and the carbon itself is oxidized. After the carbon in the thin layer is oxidized, the chromium therein is oxidized to $Cr_2O_3$. This $Cr_2O_3$ melts at a high temperature and leads to a stiffening of the acidic slag, reducing its corrosiveness. After the content of carbon and chromium has thus been reduced in this thin surface layer of the lining, the magnesia therein is slowly worn. These reactions are continuously repeated in the underlying layers of the lining as the process goes on.

The wear of the lining is slowed down by the use of chromium or metallic chromium compounds which are converted to oxides after the carbonization, which have a high melting point or stiffen the slag in reaction therewith.

In addition to, or instead of, metallic chromium, it is possible to use metallic chromium compounds, for example chromium carbide. For economic reasons, a preferred chromium compound is ferrochromium. A particularly useful ferrochromium is ferrochromium carbide containing more than 6 weight percent, based on the amount of ferrochromium, of carbon. In this manner, the amount of carbonizable carbon in the product is increased and, under certain circumstances, this may obviate the need for adding any other carbon-containing substance. In addition, ferrochromium carbide has the advantage of being sufficiently brittle to facilitate comminution.

Ferrochromium additives in refractory materials are known but not the simultaneous presence of carbon for obtaining the described wear-inhibiting effect. Austrian Pat. No. 260,094 discloses burnt magnesia bricks containing ferrochromium, which are subsequently impregnated with a carbon carrier. In this case, the ferrochromium is oxidized during the burning of the magnesia so that these bricks do not have the described wear-inhibiting effect.

The sinter magnesia of the refractory brick or mass of the present invention may be obtained from iron-rich or iron-poor natural magnesite or it may be synthesized, for example from lake water.

The following examples illustrate the practice of this invention:

EXAMPLE 1

A sinter magnesia of the following composition and granular structure:

| | | | |
|---|---|---|---|
| MgO | 96.70 weight percent | 3–5 mm, | 30 weight percent |
| CaO | 2.10 weight percent | 1–3 mm, | 20 weight percent |
| $SiO_2$ | 0.85 weight percent | up to 1 mm, | 20 weight percent |
| $Al_2O_3$ | 0.15 weight percent | up to 0.1 mm, | 30 weight percent |
| $Fe_2O_3$ | 0.20 weight percent | | | was mixed at a temperature of 160° C. with 5 weight percent of pitch having a Kraemer-Sarnow softening point of 68° C., and the mixture was pressed into bricks of quality A (comparative sample).

Bricks of quality B (invention) were produced in the same manner but 4 weight percent of ferrochromium carbide having a grain size up to 0.1 mm were added to the mixture. The ferrochromium carbide had the following composition:

| | | |
|---|---|---|
| Cr | 66.20 weight percent | |
| Fe | 23.33 weight percent | |
| Si | 0.25 weight percent | |
| C | 9.47 weight percent | |

The following test values were obtained from the respective bricks:

| Quality | A | B |
|---|---|---|
| Residual carbon (weight percent) | 2.36 | 2.62 |
| Cr (weight percent) | — | 2.42 |
| Raw density (g/cm$^3$) | 3.03 | 3.08 |
| Open porosity (volume percent) | 8.7 | 7.5 |
| Cold pressure resistance (N/mm$^2$) | 65.3 | 74.0 |

These bricks were tested in a rotary furnace to determine the resistance to an LD-slag and brick quality B showed about 50% higher resistance to the slag than comparative brick quality A.

EXAMPLE 2

Ninety-seven weight percent of another sinter magnesia of the following composition and granular structure:

| | | | |
|---|---|---|---|
| MgO | 96.30 weight percent | 3–5 mm, | 20 weight percent |
| CaO | 2.54 weight percent | 1–3 mm, | 40 weight percent |
| SiO$_2$ | 0.91 weight percent | up to 1 mm, | 17 weight percent |
| Al$_2$O$_3$ | 0.09 weight percent | up to 0.1 mm, | 20 weight percent |
| Fe$_2$O$_3$ | 0.17 weight percent | | | was mixed at a temperature of 100° C. with 3 weight percent of graphite having a grain size of 0.1 to 0.5 mm and 4 weight percent of a thin tar to obtain comparative mass C (comparative sample).

A mass D (invention) was produced in the same manner but with the addition of 5 weight percent of the same ferrochromium carbide as used in Example 1, the grain size thereof being limited to grains up to 0.5 mm.

Test bodies were produced from both masses by compaction with 40 blows with a ram implement, corresponding to a pressure of about 10 N/mm$^2$. The following test values were obtained from the respective masses:

| Mass | C | D |
|---|---|---|
| Residual carbon (weight percent) | 2.73 | 3.04 |
| Cr (weight percent) | — | 3.15 |
| Raw density (g/cm$^3$) | 2.65 | 2.73 |
| Cold pressure resistance (N/mm$^2$) | 20.0 | 31.0 |

When the masses were used as linings in a test electric arc furnace, mass D produced about one third higher durability than comparative mass C.

What is claimed is:

1. A refractory, carbon-containing and uncarbonized brick or mass based on sinter magnesia, consisting essentially of an amount of a carbon-containing substance producing a residual content of 2 to 30% of carbon in an end product after carbonization, as determined by ASTM norm C 831-76, 1 to 20%, calculated as chromium metal, of metallic chromium or a metallic chromium compound, the metallic chromium or metallic chromium compound being primarily fine-grained and at least 80% thereof, based on the chromium metal content, having a grain size of less than 1 mm, and 60 to 97% of sinter magnesia, all percentages being by weight.

2. The refractory brick or mass of claim 1, wherein the carbon-containing substance is in liquid form.

3. The refractory brick or mass of claim 1, wherein the carbon-containing substance is in solid form.

4. The refractory brick or mass of claim 1, wherein the chromium compound is ferrochromium.

5. The refractory brick or mass of claim 4, wherein the ferrochromium is ferrochromium carbide containing more than 6 weight percent, based on the amount of ferrochromium, of carbon.

* * * * *

UNITED STATES PATENT AND TRADEMARK OFFICE
CERTIFICATE OF CORRECTION

PATENT NO. : 4,315,992
DATED : Feb.16, 1982
INVENTOR(S) : Hans-Jürgen Gulas

It is certified that error appears in the above-identified patent and that said Letters Patent are hereby corrected as shown below:

In the heading on the title page, above the line and at [75], change Guls" to --GULAS--

*Signed and Sealed this*

*Twenty-fifth* Day of *May 1982*

[SEAL]

*Attest:*

*Attesting Officer*

GERALD J. MOSSINGHOFF

*Commissioner of Patents and Trademarks*